UNITED STATES PATENT OFFICE.

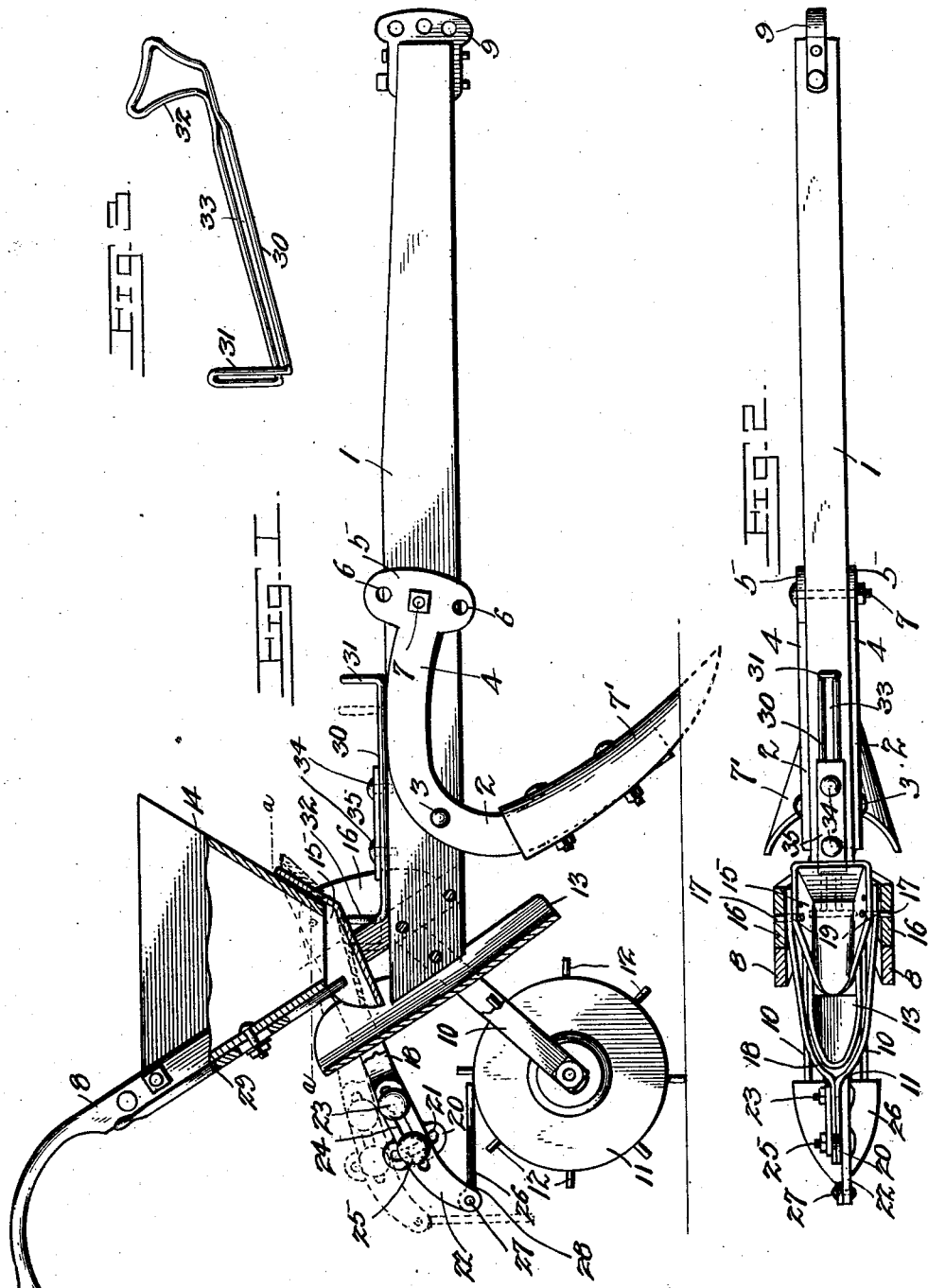

JAMES E. HARPER, OF HULETT, GEORGIA.

FERTILIZER-DISTRIBUTER.

SPECIFICATION forming part of Letters Patent No. 688,307, dated December 10, 1901.

Application filed August 5, 1901. Serial No. 70,975. (No model.)

*To all whom it may concern:*

Be it known that I, JAMES E. HARPER, a citizen of the United States, residing at Hulett, in the county of Carroll and State of Georgia, have invented a new and useful Fertilizer-Distributer, of which the following is a specification.

My invention is an improved fertilizer-distributer; and it consists in the peculiar construction and combination of devices hereinafter fully set forth and claimed.

In the accompanying drawings, Figure 1 is a side elevation, partly in section, of a fertilizer-distributer embodying my improvements. Fig. 2 is partly a top plan view and partly a horizontal sectional view of the same, taken on a plane indicated by the line *a a* of Fig. 1. Fig. 3 is a detail perspective view of the longitudinally-adjustable bar for adjusting the shaking-pan.

To the beam 1 is pivotally connected the standard 2, as at 3. The standard 2 is substantially U-shaped, being bent from a single bar of metal, and is provided at its upper end with forwardly-extending arms 4, which bear against opposite sides of the beam 1 and are enlarged to form heads 5, which are provided with adjusting-openings 6. A bolt 7, which passes through the beam 1 and through appropriate adjusting-openings 6, secures the standard at any desired angle. The standard carries a furrow-opening plow 7'.

A pair of handles 8 of usual form are attached to the beam near the rear end of the latter, and the beam is provided at its front end with a suitable clevis 9. A pair of downwardly-inclined rearwardly-extending bars 10 are attached to the rear end of the beam and are provided at their lower ends with bearings for the axle-spindle of an operating-wheel 11, which is disposed between the said bars 10, is adapted to run in the bottom of the furrow in rear of the furrow-opener, and is provided at suitable regular distances apart with projecting peripheral spurs 12.

To the rear end of the beam 1 is secured an inclined spout 13, the front side of which is open. A hopper 14 of suitable form and dimensions is secured between the handles 8. The lower side of the hopper is open, as shown in Fig. 1. A shaking-pan 15 is disposed below the hopper, the side walls of the said shaking-pan embracing the sides of the hopper near the bottom of the latter, and the said shaking-pan is pivotally mounted between bearings 16, which are secured on the beam 1, the pivots of the hopper, which have the same axis, being indicated at 17. The rear side of the shaking-pan is open, as shown, and the front side thereof is closed. A shaking-bar 18 has its front portion bifurcated, the forks thereof being secured to the sides of the shaking-pan, as at 19. The said shaking-bar projects rearwardly from the shaking-pan and is provided at its rear end with an enlarged head 20, disposed in a vertical plane, which head is provided with a curved slot 21. An extensible arm 22 is secured to the rear portion of the shaking-bar 18 by a pivotal bolt 23, which passes through a longitudinal slot 24, with which said arm is provided, and by a bolt 25, which also passes through said slot 24 and through said curved slot 21. Hence the said arm 22 is adapted to be adjusted longitudinally on the bar 18 and is also adapted to be disposed at any desired angle in a vertical plane with relation thereto. The said arm 22 at its outer rear end carries a tappet 26, which is pivotally connected thereto, as at 27. The said tappet has a shoulder 28, which acts as a stop and by contact with said arm 22 forms a rigid connection between the tappet and said arm when the said tappet occupies the relation to said arm that is shown in the full lines in Fig. 1. The said tappet is adapted to bear on the upper side of the operating-wheel 11 and to be successively engaged by the spurs 12 thereof as said wheel revolves to impart vertical vibratory motion to the bar 18, and hence to the shaking-pan, to cause the latter to distribute fertilizer from the hopper and discharge the same into the spout 13, from which spout the fertilizer falls into the furrow, as will be understood. By changing the angle of the arm 22 with relation to the bar 18 the extent of the vibration of the bar 18 and of the shaking-pan can be regulated at will to cause the fertilizer to be distributed in any desired quantity. On the rear side of the hopper is a gage-plate 29, the lower end of which is movable toward and from the shaking-pan to regulate the quantity of fertilizer discharged therefrom. I also provide a longitudinally-movable adjusting-bar 30. The same is preferably of the form shown in Fig. 3 and is provided at its front end with a handle 31, by which it may be moved, and at its rear end with an upturned arm 32. The latter is adapted to bear under the shaking-pan, and when said adjusting-bar 30 is moved rearwardly, as shown in dotted lines in Fig. 1, it upturns the rear end of the shaking-pan, raises the shaking-bar 18, and hence causes the tappet 26 to be carried out of the plane of rotation and the path of the spurs 12, so that the machine is thrown out of gear. When the said adjusting-bar 30 is moved forward to the position shown in full lines in Fig. 1, the tappet is in engagement with the operating-wheel and the machine is adjusted for operation. Any suitable means may be employed to secure and guide the bar 30 on the beam 1. As here shown, the said bar has a longitudinal slot 33, through which passes guide-bolts 34, that enter the beam 1, a guide-plate 35 being supported by said bolts, said guide-plate securing the said adjusting-bar on the beam.

Having thus described my invention, I claim—

1. In a fertilizer-distributer, the combination of an operating-wheel, a hopper, a shaking-pan, mounted under the hopper for vibration in a vertical plane, a shaking-bar attached to the shaking-pan, an arm connected to said shaking-bar and extending rearwardly therefrom, means to adjust said arm with relation to said shaking-bar, and a tappet pivotally connected to said arm having a stop to engage the latter, said tappet extending forwardly and adapted to engage said operating-wheel, substantially as described.

2. In a fertilizer-distributer, the combination of an operating-wheel, a hopper, a shaking-pan mounted under the hopper for vibration in a vertical plane, a shaking-bar attached to the said shaking-pan, an arm connected to said shaking-bar and extending rearwardly therefrom, means to adjust said arm with relation to said shaking-bar, a tappet, pivotally connected to said arm, having a stop to engage the latter, said tappet extending forwardly and adapted to engage said operating-wheel, and means to support said shaking-pan in a raised position, to permit idle movement of the tappet on the operating-wheel, without operating said pan, substantially as described.

3. In a fertilizer-distributer, the combination of an operating-wheel, a hopper, a shaking-pan mounted under the hopper for vibration in a vertical plane, a shaking-bar attached to the shaking-pan, a tappet connected to said shaking-bar and adapted to be engaged by said operating-wheel, and a longitudinally-shiftable bar having an element adapted to bear under, raise and support the rear end of the pan in an elevated position to disengage said tappet from said operating-wheel, substantially as described.

In testimony that I claim the foregoing as my own I have hereto affixed my signature in the presence of two witnesses.

JAMES E. HARPER.

Witnesses:
R. L. KING,
A. H. HINESLEY.